(12) United States Patent
Chandra et al.

(10) Patent No.: US 7,864,798 B2
(45) Date of Patent: Jan. 4, 2011

(54) METHOD AND APPARATUS FOR SUPPORTING VOICE OVER IP SERVICES OVER A CELLULAR WIRELESS COMMUNICATION NETWORK

(75) Inventors: Arty Chandra, Manhasset Hills, NY (US); Stephen E. Terry, Northport, NY (US); Mohammed Sammour, Montreal (CA); Jin Wang, Central Islip, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 896 days.

(21) Appl. No.: 11/560,590

(22) Filed: Nov. 16, 2006

(65) Prior Publication Data

US 2007/0223469 A1     Sep. 27, 2007

Related U.S. Application Data

(60) Provisional application No. 60/737,609, filed on Nov. 17, 2005, provisional application No. 60/839,197, filed on Aug. 21, 2006.

(51) Int. Cl.
*H03M 13/03* (2006.01)

(52) U.S. Cl. .............. 370/466; 370/469; 714/751; 714/752

(58) Field of Classification Search ............. 370/328, 370/338, 400, 401, 465, 466, 469; 714/746, 714/751, 752, 758, 774, 799

See application file for complete search history.

(56) References Cited

U.S. PATENT DOCUMENTS

6,330,288 B1 *   12/2001   Budka et al. ............. 375/296

(Continued)

FOREIGN PATENT DOCUMENTS

EP     1 443 784     8/2004

(Continued)

OTHER PUBLICATIONS

3GPP, *3rd Generation Partnership Project; Technical Specification Group Radio Access Network; Medium Access Control (MAC) Protocol Specification (Release 6)*, 3GPP TS 25.321 V6.10.0, (Sep. 2006).

(Continued)

*Primary Examiner*—Pankaj Kumar
*Assistant Examiner*—Duc T Duong
(74) *Attorney, Agent, or Firm*—Volpe and Koenig, P.C.

(57) ABSTRACT

A method and system for supporting voice over Internet protocol (VoIP) services over a wireless communication network are disclosed. Data is encoded at a coding rate specified by a controller for generating a VoIP packet. Among the encoded data, bits sensitive to errors and bits not sensitive to errors are identified and error protection is performed separately by a medium access control layer and/or physical layer. A header of the VoIP packet may be selectively compressed in accordance with an indication from the controller. A user datagram protocol (UDP)-Lite may be used for partial coverage of the sensitive bits. A comfort noise may be generated by a receiving end during a silence period without receiving a comfort noise packet from a transmitting end. If the VoIP packet is not fit into a currently assigned radio resource, the VoIP packet may be fragmented.

76 Claims, 4 Drawing Sheets

U.S. PATENT DOCUMENTS

| | | | |
|---|---|---|---|
| 6,947,446 B2 * | 9/2005 | LoGalbo et al. | 370/468 |
| 7,103,020 B2 * | 9/2006 | Eriksson et al. | 370/328 |
| 7,145,919 B2 * | 12/2006 | Krishnarajah et al. | 370/474 |
| 2002/0181423 A1 | 12/2002 | Chen et al. | |
| 2003/0101408 A1 * | 5/2003 | Martinian et al. | 714/776 |
| 2005/0201286 A1 * | 9/2005 | Taylor et al. | 370/235 |
| 2006/0245417 A1 * | 11/2006 | Conner et al. | 370/352 |
| 2007/0104224 A1 * | 5/2007 | Conner et al. | 370/474 |

FOREIGN PATENT DOCUMENTS

| | | |
|---|---|---|
| EP | 1 557 968 | 7/2005 |
| WO | 02/51072 | 6/2002 |

OTHER PUBLICATIONS

3GPP, *3rd Generation Partnership Project; Technical Specification Group Radio Access Network; Medium Access Control (MAC) Protocol Specification (Release 6)*, 3GPP TS 25.321 V6.6.0, (Sep. 2005).

* cited by examiner

METHOD AND APPARATUS FOR SUPPORTING VOICE OVER IP SERVICES OVER A CELLULAR WIRELESS COMMUNICATION NETWORK

CROSS REFERENCE TO RELATED APPLICATIONS

This application claims the benefit of U.S. Provisional Application No. 60/737,609 filed Nov. 17, 2005 and U.S. Provisional Application No. 60/839,197 filed Aug. 21, 2006, which are incorporated by reference as if fully set forth.

FIELD OF INVENTION

The present invention is related to a wireless communication system. More particularly, the present invention is related to a method and system for supporting voice over Internet protocol (VoIP) services over a wireless communication network.

BACKGROUND

The notion of providing VoIP services over a cellular wireless network has been proposed. However, supporting VoIP services over a conventional cellular wireless network, such as a third generation partnership project (3GPP) network, is challenging. A VoIP service is a variable low bit rate, delay and jitter sensitive application. The data rate for the VoIP services can vary from 8 kbps to 42 kbps depending on the codec rate and packet header compression.

A problem with VoIP over cellular networks is the large amount of overhead. Speech data for VoIP is likely to be carried by a real-time transport protocol (RTP). The VoIP packet, in addition to a link layer framing, includes an IP header (20 octets for IPv4), a UDP header (8 octets) and an RTP header (12 octets) for a total of 40 octets. With IPv6, the IP header is 40 octets for a total of 60 octets. The size of the payload depends on the speech coding and frame sizes being used and is somewhere between 15 bytes to 75 bytes.

In the 3GPP standards, packet switched domain, each packet contains control information, (both common and dedicated control information). The common control information includes scheduling information, user equipment (UE) identity and a transport format combination indicator (TFCI) of the packet (such as modulation and coding scheme (MCS) and packet size). The dedicated control information includes hybrid automatic repeat request (H-ARQ) process information and transmission sequence number. The control information adds significant overhead to the VoIP packet in the range of around 20%.

In long tem evolution (LTE) of the 3GPP standards, the physical layer air interface is orthogonal frequency division multiplexing (OFDM) multiple-input multiple-output (MIMO). Uplink and downlink resources comprise a set of sub-carriers. In the uplink, a varying modulation and coding scheme may support variable data rate that may not be sufficient to fit a packet within available resources. For example, a retransmitted packet may be successfully decoded if transmitted at a lower modulation and robust coding scheme. However, in this case, it may not be possible to fit the packet within the available resources.

Therefore, it would be desirable to provide a method for reducing the control overhead associated with a VoIP packet and for more flexibility to support a variable data rate.

SUMMARY

The present invention is related to a method and system for supporting VoIP services over a cellular wireless communication network. Data is encoded at a coding rate specified by a controller for generating a VoIP packet. Among the encoded data, bits perceptually sensitive to errors and bits perceptually not sensitive to errors are identified and error protection may be performed separately by a medium access control (MAC) layer and/or physical layer. A header of the VoIP packet may be selectively compressed in accordance with an indication from a controller. User datagram protocol (UDP)-Lite may be used for partial coverage of the sensitive bits. UDP-Lite is a variation of UDP with increased flexibility in the form of a partial checksum. A comfort noise may be generated by a receiving end during a silence period without receiving a comfort noise packet from a transmit end.

If the VoIP packet does not fit into currently assigned radio resources, the VoIP packet may be fragmented to at least two fragments and transmitted by fragments. A request for additional radio resources may be sent along with a first fragment, and additional resources may be assigned in response to the request, whereby remaining fragments may be sent using the additional radio resources. Alternatively, the need for the additional radio resources may be implicitly known by sending a fragment, instead of the full VoIP packet. The additional resources assignment may be for the remaining fragment or the full packet. The remaining fragments may be sent using radio resources assigned for synchronous hybrid automatic repeat request (H-ARQ) retransmission of a failed VoIP packet.

DETAILED DESCRIPTION OF THE PREFERRED EMBODIMENTS

When referred to hereafter, the terminology "WTRU" includes but is not limited to a UE, a mobile station (STA), a fixed or mobile subscriber unit, a pager, or any other type of device capable of operating in a wireless environment. When referred to hereafter, the terminology "Node-B" includes but is not limited to a base station, a site controller, an access point (AP) or any other type of interfacing device in a wireless environment. When referred to hereafter, the terminology "VoIP" includes any real-time (RT) services over IP, not limited to voice services but any RT services, such as video services.

The features of the present invention may be incorporated into an integrated circuit (IC) or be configured in a circuit comprising a multitude of interconnecting components.

The present invention is applicable to any wireless communication system including, but not limited to, 3GPP, evolutions of high speed packet access (HSPA) systems (HSPA+), such as high speed downlink packet access (HSDPA) or high speed uplink packet access (HSUPA) evolutions, and LTE of 3GPP standards.

Figure 1:
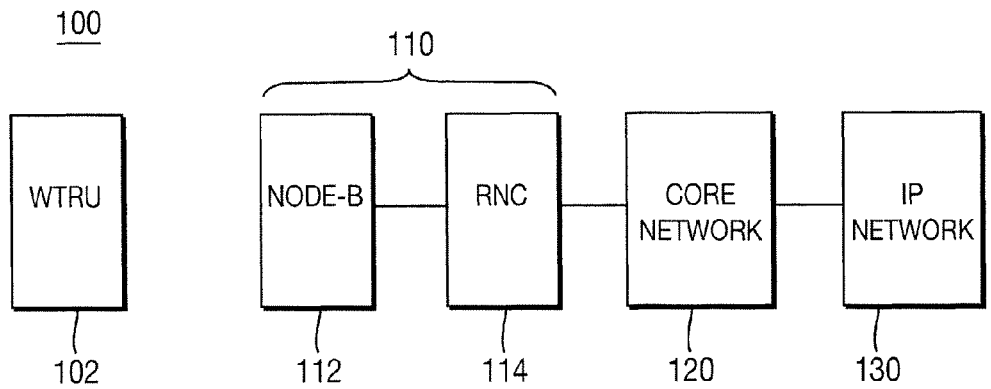
FIG. 1 is a block diagram of an exemplary wireless communication system configured in accordance with the present invention.

FIG. 1 is a block diagram of an exemplary wireless communication system 100 configured in accordance with the present invention. The system 100 includes a WTRU 102, a radio access network (RAN) 110 and a core network 120. The RAN 110 includes a Node-B 112 and may also include a radio network controller (RNC) 114. If the RNC 114 does not exist, (such as in LTE), the Node-B 112 is directly connected to the core network 120. The core network 120, (may also be called access gateway (aGW)), is connected to an IP network 130. Preferably, the Node-B 112 assigns radio resources for the WTRU 102 and the WTRU 102 transmits and receives VoIP packets using the assigned resources over the wireless communication network 100.

Figure 2:
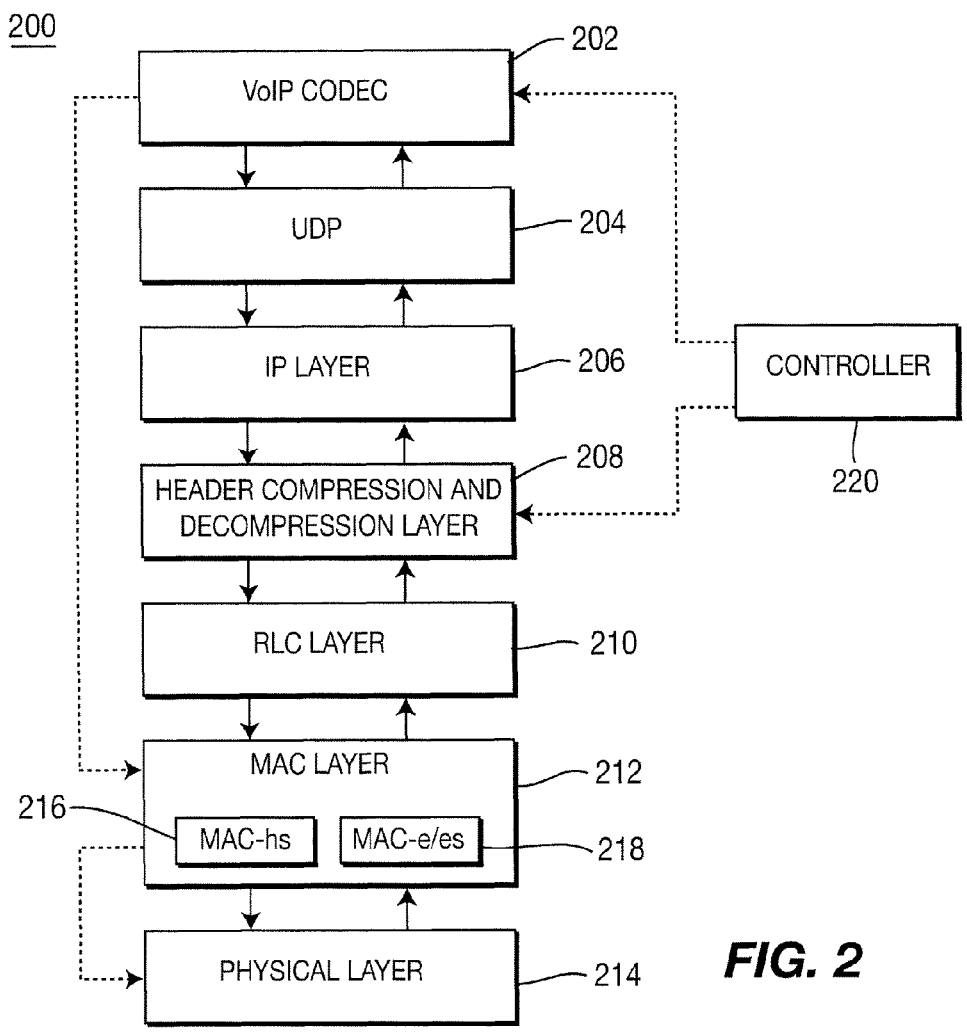
FIG. 2 is a block diagram of an apparatus for supporting VoIP over a wireless communication network in accordance with the present invention.

FIG. 2 is a block diagram of an apparatus 200 for supporting VoIP over a wireless communication network in accordance with the present invention. The apparatus 200 may be a WTRU 102 or an entity in the RAN 110 or the core network 120. The apparatus 200 includes a VoIP codec 202, a UDP layer 204 (preferably a UDP-Lite layer), an IP layer 206, a header compression and decompression layer 208, an RLC layer 210, a MAC layer 212 and a physical layer 214.

The VoIP codec 202 encodes transmit data, (i.e., voice, video or any other data), for transmission, and decodes received data. Adaptive multi-rate (AMR) and adaptive multi-rate wideband (AMR-WB) are the VoIP codec chosen for the 3GPP system. Eight encoding modes are supported by AMR and nine encoding modes are supported by AMR-WB. AMR supports bit rates ranging from 4.75 kbps to 12.2 kbps, and AMR-WB supports bit rates ranging from 6.6 kbps to 23.85 kbps. The multi-rate encoding capability of AMR and AMR-WB is designed for preserving high quality under wide range of transmission conditions. To perform mode adaptation, a decoder sends a codec mode request (CMR) to an encoder of a communication peer for a new mode that the decoder prefers. The CMR may be sent as in-band signaling with a VoIP packet.

The speech or video bits encoded by the VoIP codec 202 in an AMR or AMR-WB frame have different perceptual sensitivity to bit errors. This property may be utilized to achieve better quality by using unequal error protection and detection. Among the encoded transmit data, bits sensitive to errors and bits not sensitive to errors may be identified by the VoIP codec 202. The sensitive bits and non-sensitive bits may be processed separately for error protection by the UDP layer 204, the MAC layer 212 or the physical layer 214, which will be explained in detail hereafter.

The codec rate, (i.e., coding and decoding rate), of the VoIP codec 202 is specified by a controller 220. The controller 220 may be an independent network entity or may reside in a WTRU 102 or any other existing network entity, (such as a Node-B 112, an RNC 114, or a radio resource management (RRM) entity in a core network 120). This ensures quicker adaptation of the codec rate to radio conditions. The controller 220 detects a change of the radio conditions and sends a signal to the VoIP codec 202 to adjust the codec rate.

The controller 220 may send a CMR to an encoder, (i.e., VoIP codec of transmitting end), as an out-of-band signal. The CMR indicates a maximum coding rate that may be used by the encoder. Alternatively, the controller 220 may send an indication indicating a need to change the coding rate to a decoder, (i.e., VoIP codec of receiving end), and the decoder may send a CMR to an encoder of the communication peer in response to the indication. Alternatively, a received CMR in a received VoIP packet from the communication peer may be modified before sending it to the VoIP codec 202. The VoIP data rate on the transmitting end is changed based on transmit channel conditions. In the WTRU 102, the VoIP encoder may change the coding rate based on the out-of-band indication from the controller 220. However, on the network side, it is not possible to send the out-of-band indication. Hence, the controller 220 at the WTRU 102 may send the data rate change indication to the decoder. Based on this indication, the decoder at the WTRU 102 may generate a CMR and send it to the encoder at the network side.

Both AMR and AMR-WB VoIP codecs support voice activity detection and generation of comfort noise parameters during silence periods. Conventionally, a comfort noise packet is sent from a transmitting end to a receiving end during a silence period. In accordance with the present invention, the apparatus 200 may include a comfort noise generator (not shown) to generate a comfort noise during a silence period. The comfort noise is generated at the receiving end without receiving a comfort noise packet from the transmitting end. This saves physical layer resource during a silent period.

The UDP layer 204, (preferably UDP-Lite layer), attaches a UDP header, (preferably a UDP-Lite header), to encoded transmit data to generate a UDP packet, (preferably a UDP-Lite packet). UDP-Lite is a variation of UDP for providing an increased flexibility in the form of a partial checksum. The UDP-Lite header includes a checksum value and a checksum coverage field. The checksum coverage field indicates the length of the bits covered by the checksum value in the UDP-Lite header. When the checksum value covers the entire packet, which is a default, UDP-Lite is semantically identical to UDP. When the UDP-Lite is active, a packet is divided into sensitive bits and insensitive bits, and the checksum value is calculated for covering the sensitive bits. Errors in the insensitive bits will not cause the packet to be discarded by the transport layer at the receiving end.

The IP layer 206 generates a transmit VoIP packet from the encoded transmit data by attaching an IP header. The IP layer 206 also processes a receive VoIP packet, removes an IP header and forwards the remaining portion of the packet to the upper layer.

The header compression and decompression layer 208 compresses a header of the transmit VoIP packet and decompresses a header of the receive VoIP packet. Robust header compression (ROHC) is one of the header compression mechanisms. The header compression and decompression layer 208 selectively performs the compression and decompression in accordance with an indication from the controller 220. The header compression and decompression layer 208 sends an uncompressed header in order to reduce error propagation under certain conditions. For example, during handover or when a link condition is poor, the controller 220 indicates to the header compression and decompression layer 208 to send a complete header. The controller 220 may reside in a core network 120, or in a WTRU 102 and a Node-B 112, respectively.

Alternatively, the header compression and decompression layer 208 may selectively perform compression based on a feedback packet sent by a network entity, (e.g., access gateway). The feedback packet indicates a link condition, a need for a handover, or the like.

When UDP-Lite is implemented, a network entity, (e.g., either access gateway, core network, or VoIP gateway), sends an indication to the header compression and decompression layer 208 whether or not UDP-Lite is active during a VoIP session. If UDP-Lite is active, then the checksum coverage field of the UDP-Lite header is not compressed during header compression. This is to ensure accurate CRC of the packet.

The RLC layer 210 provides an in-sequence delivery of the VoIP packet. The RLC layer 210 generates a transmit RLC protocol data unit (PDU) from the transmit VoIP packet and generates a receive VoIP packet from a receive RLC PDU. The VoIP packets are sent over unacknowledged mode (UM) RLC. The UM RLC provides detection of erroneous data, duplication avoidance and reordering. The RLC layer 210 may perform fragmentation of an IP packet. In accordance with the present invention, the RLC 210, (i.e., UM RLC), sends all packets received from the MAC layer 212 to the IP layer 206 or the header compression and decompression layer 208 with an indication whether or not the packet was received successfully.

The MAC layer 212 provides data transfer services between communication peers. The MAC layer 212 generates a transmit MAC PDU from the transmit RLC PDU and generates a receive RLC PDU from a receive MAC PDU. The MAC layer 212 supports unequal error protection for the sensitive bits and non-sensitive bits, variable packet size and retransmission of the packets within a predetermined time period.

The MAC layer 212 may receive an indication about the number of sensitive bits for each VoIP Packet from the VoIP codec 202. The MAC layer 212 may fragment the VoIP packet into a plurality of equal or unequal size fragments. The MAC layer 212 attaches a separate cyclic redundancy check (CRC) to each fragment. The MAC layer 212 generates the fragments such that the sensitive bits are spread in a minimum number of fragments.

If the MAC layer 212 may send multiple transport blocks, (e.g., H-ARQ PDUs), in the same transmission time interval (TTI), the MAC layer 212 may send all or multiple fragments in the same TTI as different TBs. If the MAC layer 212 may send only one TB in a TTI, the fragments are transmitted in different TTI. Each TB is preferably attached with a separate CRC. A different CRC having different strength may be attached, (i.e., a stronger CRC may be attached to a TB including sensitive bits). Alternatively, a CRC may be attached only to a TB including sensitive bits.

Alternatively, the fragmentation may be performed without an explicit indication about the sensitive bits. The VoIP codec 202 outputs its bits in a predetermined order in terms of sensitivity. For example, the VoIP codec 202 may output bits having higher sensitivity in the last (or first) X bits in the packet, (i.e., X bits after the headers, such as an IP header). The MAC layer 212 fragments the VoIP packet into N fragments and assigns different robustness to those fragments according to their order. For example, if the sensitive bits are the last in the VoIP packet, the last fragment may have the highest error protection. The advantage of such scheme is that there is no need for explicit signaling.

Alternatively, the RLC layer 210, rather than the MAC layer 212, may perform the fragmentation of the VoIP packet with or without receiving the explicit indication about the sensitive bits.

The physical layer 214 transmits the transmit MAC PDU via a wireless channel and generates a receive MAC PDU from received data. The physical layer 214 receives an indication regarding the fragments that have sensitive bits from the MAC layer 212. The physical layer 214 then performs lower modulation and better coding on the fragments including the sensitive bits.

Alternatively, the MAC layer 212 may not fragment the transmit VoIP packet, but indicates the number and position of the sensitive bits to the physical layer 214. The physical layer 214 then performs better coding for the sensitive bits (such as less puncturing on the sensitive bits and/or more repetition of the sensitive bits).

The MAC layer 212 includes MAC-hs 216 and/or MAC-e/es 218. It should be noted that the terms "hs" and "e/es" are employed to indicate specific MAC functions and the present invention is not limited to any specific MAC functions related to these terms, but is applicable to any MAC functions regardless of the notations of the specific MAC functions. MAC-hs 216 is responsible for management of physical resources and packet transmission in the downlink for high speed downlink packet access (HSDPA). MAC-hs 216 provides fast scheduling and retransmissions (if necessary). HSDPA implements asynchronous hybrid automatic repeat request (H-ARQ) processes. A packet is transmitted (or re-transmitted) from the same H-ARQ process at any time. Transmission of a packet may be based on the priority of the packet.

In the uplink, MAC-e/es 218 provides fast scheduling and retransmission for high speed uplink packet access (HSUPA). In HSUPA, four H-ARQ processes are provided for a 10 msec transmission time interval (TTI) and eight H-ARQ processes are provided for a 2 msec TTI. The H-ARQ scheme in HSUPA is a synchronous H-ARQ. Hence, a packet is transmitted (or re-transmitted) from the same H-ARQ process "N" TTIs after the previous transmission, where N=4 and N=8 for a 10 msec TTI and a 2 msec TTI, respectively. The conventional VoIP codec generates a packet every 20 msec. In order to support the synchronized H-ARQ, the number of H-ARQ processes may be adjusted to match the VoIP packet generation rate. For example, the number of H-ARQ processes may be increased to ten (10) for a 2 msec TTI to match the 20 msec VoIP packet generation rate. Alternatively, two or more H-ARQ processes which are separated as far as possible may be assigned for VoIP services. For example, in a case of eight (8) H-ARQ processes, H-ARQ processes one and five may be assigned for VoIP services.

The Node-B 112 preferably assigns radio resources to the WTRU 102 by sending control information. The control information may be sent either in a control packet or over a control channel. In accordance with the present invention, to reduce control overhead, radio resources are assigned to multiple WTRUs 102 for a predetermined duration at the same time via a single control packet for a longer duration. The control information covers multiple WTRUs 102. WTRUs 102 in similar channel conditions can be grouped together. Since the channel conditions are similar, similar amount of resources may be assigned to and similar modulation and coding scheme may be used by the group of WTRUs 102. Only assigned resources and the WTRU identities need to be indicated in the control packet for individual WTRUs 102. Therefore, control overhead is reduced.

In addition, the control information is sent periodically, (e.g., 10 msec or 20 msec). The period for radio resource assignment may be based on the codec rate and re-transmission probability. Due to the periodicity of the radio resource assignment, less bits may be used for certain control information, such as scheduling information and WTRU identity.

However, the disadvantage is waste of bandwidth in the uplink if the assigned resources are not used by the WTRU 102. Therefore, the WTRU 102 should use the assigned resources for any other user or control data flow. In this case, a special bit(s) is assigned to indicate a change in control information and/or data flow so that the receiver understands that the packet is from a different flow and decode the corresponding control information.

In LTE of 3GPP, the physical layer radio interface is OFDM MIMO. Radio resources are divided into a set of subcarriers. The Node-B 112 periodically assigns a set of subcarriers to the WTRU 102. The periodic resources may not be sufficient if the packet size or MCS changes, assuming that minimum required resources are periodically assigned to each WTRU 102. As an example, a retransmitted packet may be successfully transmitted if transmitted at lower modulation and robust coding. However, in this case, it may not be possible to fit the packet within the assigned resources.

Figure 3:
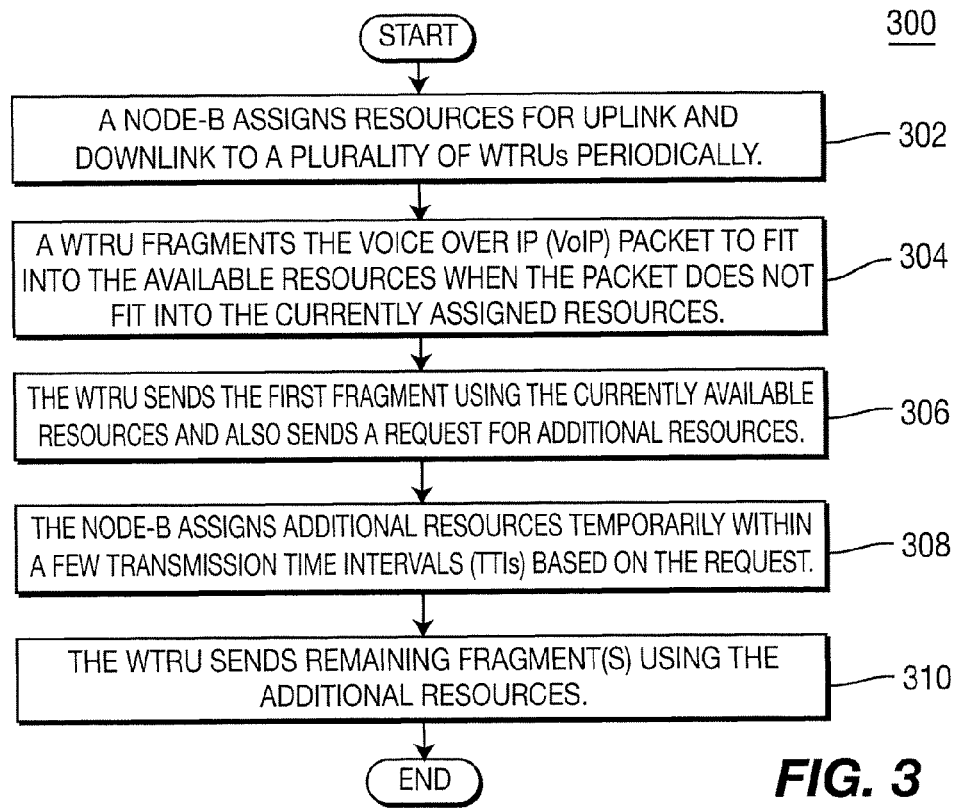
FIG. 3 is a flow diagram of a process for sending VoIP packets in the uplink in accordance with one embodiment of the present invention.

In accordance with the present invention, when the VoIP packet does not fit into the assigned resources, the WTRU 102 fragments the VoIP packet and sends a request for additional resources to the Node-B 112. FIG. 3 is a flow diagram of a process 300 for sending VoIP packets in the uplink in accordance with one embodiment of the present invention. A Node-B 112 assigns resources for the uplink and the downlink to a plurality of WTRUs 102 periodically as stated above (step 302). A WTRU 102 fragments the VoIP packet to fit into the available resources when the packet does not fit into the currently assigned resources (step 304). The WTRU 102 then sends the first fragment using the currently available resources and also sends a request for additional resources (step 306). The request may be sent by RLC, MAC or physical layer signaling. The extra needed resources may be determined by a transport format combination (TFC) selection procedure. The Node-B 112 then assigns additional resources temporarily within a few TTIs based on the request (step 308). The WTRU 102 sends remaining fragment(s) using the additional resources (step 310).

When the Node-B 112 receives the request, the Node-B 112 may or may not receive the first fragment successfully. If the Node-B 112 received the first fragment successfully, the Node-B 112 assigns additional resources to the WTRU so that the WTRU 102 sends the remaining fragments using the additional resources. If the Node-B 112 received the first fragment unsuccessfully, (assuming that the request is part of physical layer control signaling, (e.g., H-ARQ associated control signaling)), the Node-B 112 may assign resources for transmission of the full packet, instead of the fragments, and send a negative acknowledgement (NACK) to the WTRU 102. Upon receipt of the new resource assignment and NACK, the WTRU 102 may terminate the old H-ARQ transmission and initiate a new H-ARQ transmission to send the full packet, instead of the fragments, using the new resources.

Figure 4:
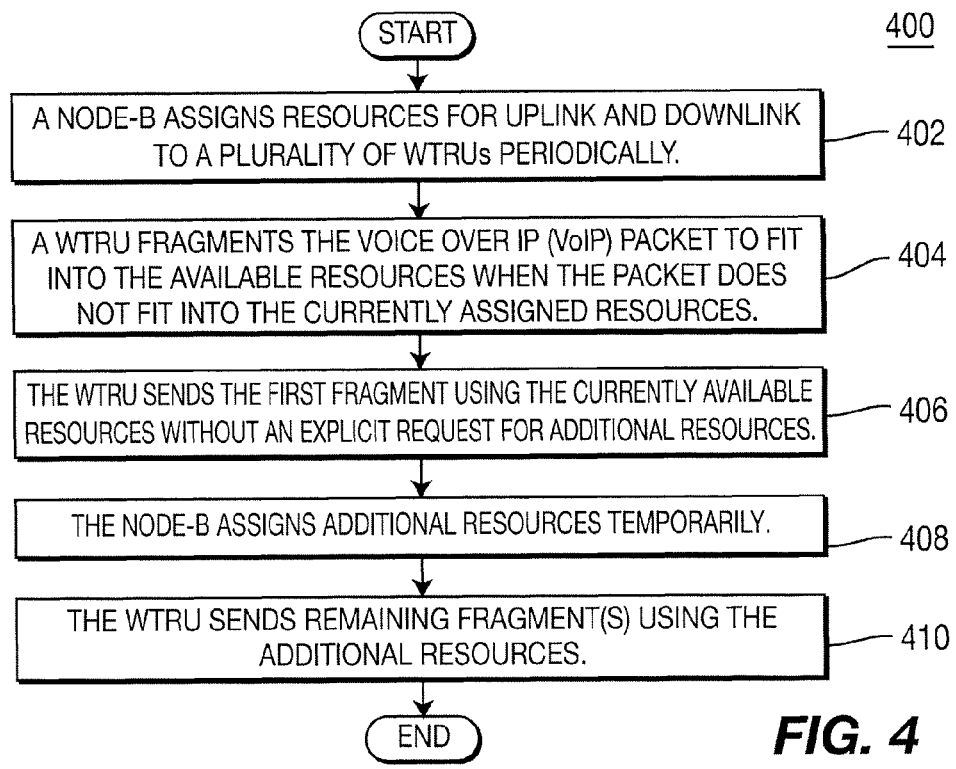
FIG. 4 is a flow diagram of a process for sending VoIP packets in the uplink in accordance with another embodiment of the present invention.

FIG. 4 is a flow diagram of a process 400 for sending VoIP packets in the uplink in accordance with another embodiment of the present invention. A Node-B 112 assigns resources for the uplink and the downlink to a plurality of WTRUs 102 periodically (step 402). A WTRU 102 fragments the VoIP packet to fit into the available resources when the packet does not fit into the currently assigned resources (step 404). The WTRU 102 then sends the first fragment using the currently available resources without an explicit request for additional resources (step 406). The Node-B 112 implicitly knows that more resources are needed when the Node-B 112 receives a fragment of a packet instead of a full packet and allocates additional temporary resources (step 408). This requires the Node-B 112 to decode the MAC header and RLC header in order to determine that a fragment, not a full packet, was sent. The WTRU 102 sends remaining fragment(s) using the additional resources (step 410).

The segmentation or fragmentation information contained in the MAC or RLC header may provide information that may be utilized for deciding the amount of temporary resources to be allocated, (e.g., within a fragment/segment, the segmentation scheme may provide the total number of segments belonging to the packet, or provide the total size of the packet).

Figure 5:
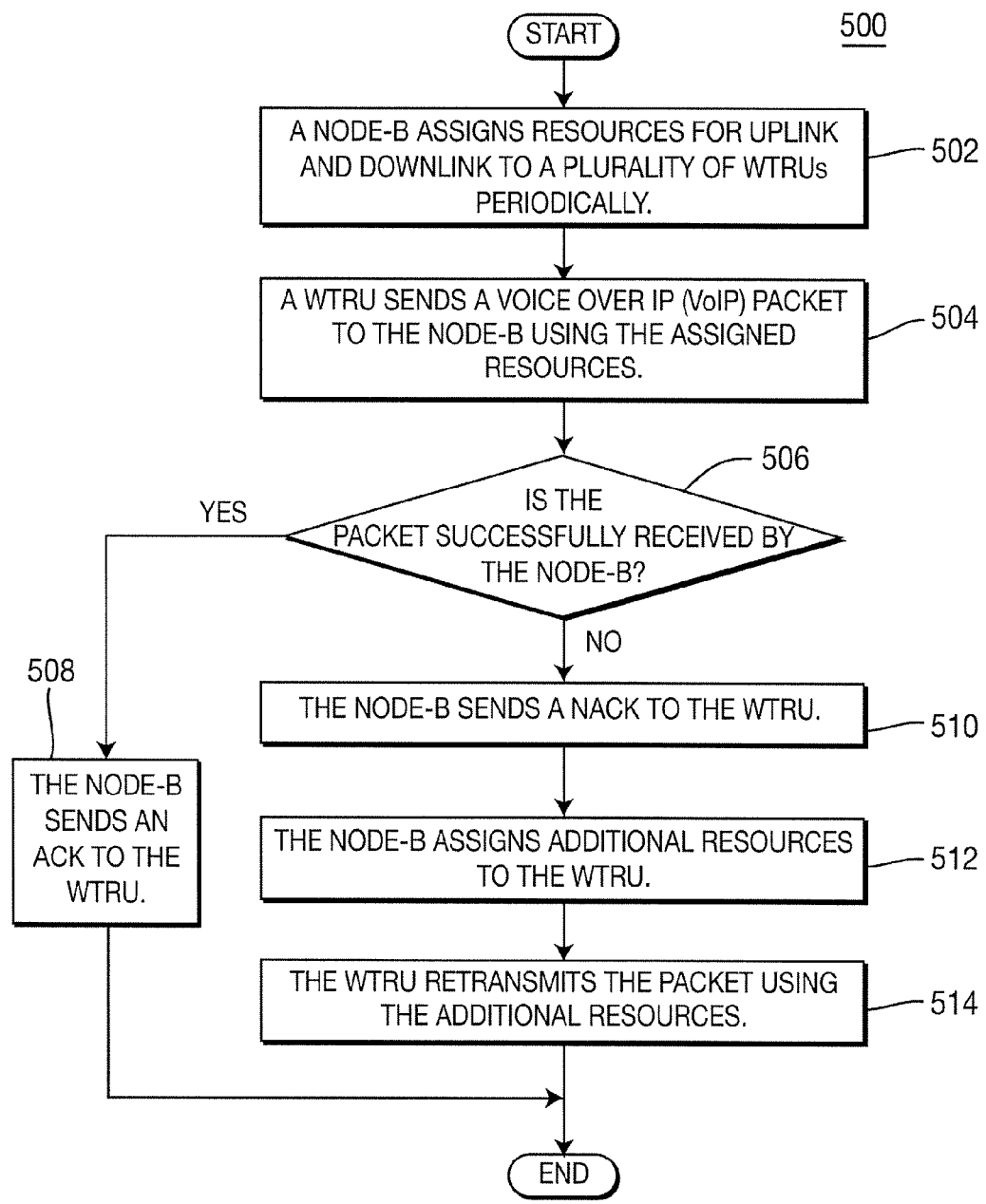
FIG. 5 is a flow diagram of a process for sending VoIP packets in the uplink in accordance with yet another embodiment of the present invention.

FIG. 5 is a flow diagram of a process 500 for sending VoIP packets in the uplink in accordance with yet another embodiment of the present invention. A Node-B 112 assigns resources for the uplink and the downlink to a plurality of WTRUs 102 periodically (step 502). A WTRU 102 sends a VoIP packet using the assigned resources (step 504). If it is determined at step 506 that the packet is successfully received, the Node-B sends an ACK to the WTRU (step 508) and the process 500 ends. If it is determined at step 506 that the packet is not successfully received, the Node-B sends a NACK to the WTRU (step 510). When the transmission fails, the Node-B 112 implicitly knows that the packet will be retransmitted via an H-ARQ mechanism. Therefore, the Node-B 112 assigns additional resources to the WTRU 102 without receiving the request for additional resources from the WTRU 102 (step 512). The WTRU 102 then sends the previous failed packet using the additional resources (step 514). The Node-B 112 may perform soft combining of the previous failed transmission and a new transmission.

Figure 6:
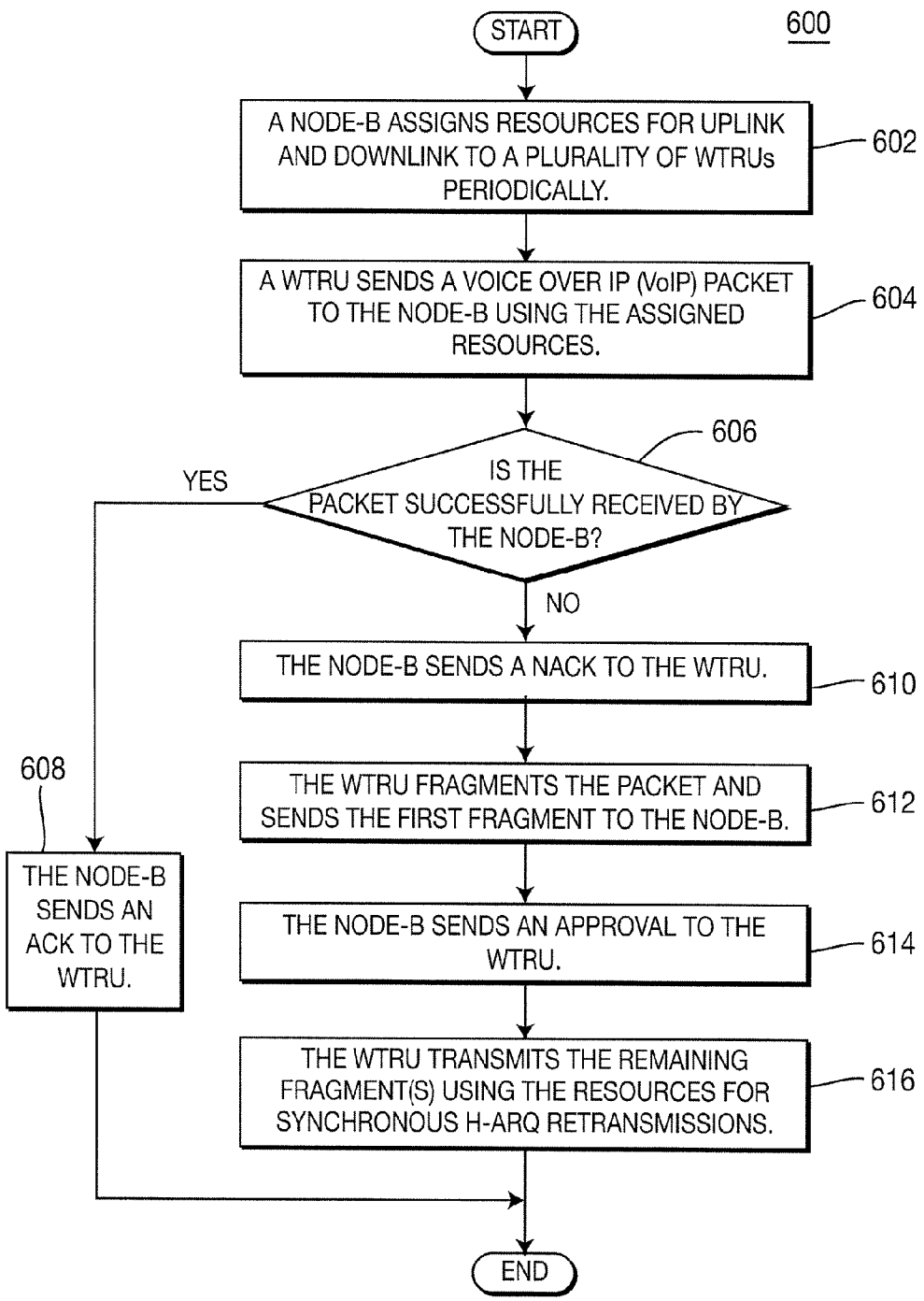
FIG. 6 is a flow diagram of a process for sending VoIP packets in the uplink in accordance with still another embodiment of the present invention.

FIG. 6 is a flow diagram of a process 600 for sending VoIP packets in the uplink in accordance with still another embodiment of the present invention. In this embodiment, a synchronous H-ARQ is used between a Node-B 112 and a WTRU 102. In synchronous H-ARQ, a retransmission of a previous failed packet occurs after a fixed (time) period following the previous transmission. Instead of explicitly allocating additional resources and sending control messages to describe those resources, the WTRU 102 utilizes the resources normally used for synchronous H-ARQ retransmissions as additional temporary resources upon approval of the Node-B 112.

The Node-B 112 assigns resources for the uplink and the downlink to a plurality of WTRUs 102 periodically (step 602). A WTRU 102 sends a VoIP packet using the assigned resources (step 604). If it is determined at step 606 that the packet is successfully received, the Node-B sends an ACK to the WTRU (step 608) and the process 600 ends. If it is determined at step 606 that the packet is not successfully received, the Node-B 112 sends a NACK to the WTRU (step 610). The WTRU 102 then fragments the packet and sends the first fragment with or without an indication that the WTRU 102 needs more resources, (i.e., the indication may be implicitly indicated as stated above), (step 612). The Node-B 112 then responds with an approval (step 614). The bit for approval may be contained along with the H-ARQ feedback or in physical layer of MAC layer signaling. Upon receipt of the approval, the WTRU 102 transmits the remaining fragment(s) using the resources for synchronous H-ARQ retransmissions, (i.e., after N TTIs) without the need for a temporary resource assignment from the Node-B 112 (step 616).

In downlink, if the currently assigned resources are not enough to carry a VoIP packet, the Node-B 112 fragments the VoIP packet and sends the first fragment using the currently assigned resources. The first fragment will have reduced control information. However, the remaining fragments that did not fit into the currently assigned resources are sent with full control information (such as resource allocation, WTRU ID, flow ID, H-ARQ process ID, or the like). It is also possible to use the same strategy for retransmission of a failed packet. The first transmission is sent over the assigned resources. If there is a need for retransmission, the retransmitted packet is sent with full control information since for retransmission or change in data rate, complete control information is needed for the packet to be decoded on the receiving side.

Although the features and elements of the present invention are described in the preferred embodiments in particular combinations, each feature or element can be used alone without the other features and elements of the preferred embodiments or in various combinations with or without other features and elements of the present invention.

What is claimed is:

1. An apparatus for supporting voice over Internet protocol (VoIP) services over a wireless communication network, the apparatus comprising:
    a VoIP codec for encoding transmit data and decoding receive data, wherein bits sensitive to errors and bits not sensitive to errors are identified among the encoded transmit data for separate error protection;
    a controller configured to:
        specify a coding rate of the VoIP codec; and
        send a codec mode request to adjust the coding rate;
    an IP layer for generating a transmit VoIP packet by attaching an IP header to the encoded transmit data and processing a receive VoIP packet;
    a radio link control (RLC) layer for in-sequence delivery of the transmit VoIP packet and the receive VoIP packet;
    a medium access control (MAC) layer for transferring the transmit VoIP packet and the receive VoIP packet between communication peers; and
    a physical layer for transmitting the transmit VoIP packet and receiving the receive VoIP packet via a wireless channel,
    wherein one of the RLC layer or the MAC layer divides the transmit VoIP packet into a plurality of fragments whereby the sensitive bits and the non-sensitive bits are separately processed for error protection and the number of fragments including the sensitive bits is as small as possible.

2. The apparatus of claim 1 wherein the VoIP codec sends an explicit indication about the bits sensitive to errors and the bits not sensitive to errors, whereby the sensitive bits and the non-sensitive bits are separately processed for error protection.

3. The apparatus of claim 1 wherein the VoIP codec outputs the transmit data in a predetermined order in accordance with sensitivity to errors, whereby the sensitive bits and the non-sensitive bits are separately processed for error protection.

4. The apparatus of claim 1 wherein the MAC layer applies a more robust modulation and coding scheme for a fragment including the sensitive bits.

5. The apparatus of claim 1 wherein the MAC layer attaches a separate cyclic redundancy check (CRC) to each fragment.

6. The apparatus of claim 5 wherein the MAC layer is configured to transmit multiple transport blocks (TBs) in a same transmission time interval (TTI) and each fragment is transmitted via a separate TB with a separate CRC.

7. The apparatus of claim 5 wherein the MAC layer is configured to transmit one transport block (TB) in a transmission time interval (TTI) and each fragment is transmitted in a different TTI.

8. The apparatus of claim 1 wherein the MAC layer attaches a cyclic redundancy check only to a fragment including the sensitive bits.

9. The apparatus of claim 1 wherein the MAC layer attaches a cyclic redundancy check having higher strength in terms of error protection to a fragment including the sensitive bits.

10. The apparatus of claim 1 wherein the sensitive bits and the non-sensitive bits are separately processed for error protection by the physical layer.

11. The apparatus of claim 10 wherein the MAC layer sends an indication about the number and position of the sensitive bits to the physical layer.

12. The apparatus of claim 10 wherein the physical layer applies less puncturing on the sensitive bits.

13. The apparatus of claim 10 wherein the physical layer applies more repetition on the sensitive bits.

14. The apparatus of claim 1 further comprising:
    a header compression and decompression entity for compressing a header of the transmit VoIP packet and decompressing a header of the receive VoIP packet.

15. The apparatus of claim 14 wherein the header compression and decompression entity selectively performs the compression and decompression in accordance with an indication from the controller.

16. The apparatus of claim 15 wherein the controller is located in one of a wireless transmit/receive unit (WTRU), a Node-B, a radio network controller (RNC), an access gateway (aGW), or a core network entity.

17. The apparatus of claim 16 wherein the header compression and decompression entity selectively performs the compression and decompression in accordance with feedback regarding radio channel condition from a network entity.

18. The apparatus of claim 1 further comprising:
    a user datagram protocol (UDP) layer for attaching and detaching a UDP-Lite header including a checksum coverage field for partial coverage of the sensitive bits.

19. The apparatus of claim 18 further comprising:
    a header compression and decompression entity for compressing a header of the transmit VoIP packet and decompressing a header of the receive VoIP packet, wherein the controller sends an indication to the header compression and decompression entity regarding whether UDP-Lite is active or not, whereby a checksum coverage field of the UDP-Lite header is not compressed when UDP-Lite is active.

20. The apparatus of claim 1 wherein the controller sends an indication indicating a need for adjusting the coding rate and a codec mode request (CMR) is sent to a communication peer in response to the indication.

21. The apparatus of claim 1 wherein the controller resides in a wireless transmit/receive unit (WTRU).

22. The apparatus of claim 1 wherein the controller resides in a Node-B.

23. The apparatus of claim 1 wherein the controller resides in an access gateway (aGW).

24. The apparatus of claim 1 further comprising:
    a comfort noise generator for generating a comfort noise, whereby the comfort noise is generated without receiving a comfort noise packet from a communication peer during a silence period.

25. The apparatus of claim 1 wherein the RLC layer sends all packets with an indication whether or not the packets are received successfully.

26. The apparatus of claim 1 wherein the MAC layer includes a plurality of hybrid automatic repeat request (H-ARQ) processes and implements synchronous H-ARQ.

27. The apparatus of claim 26 wherein at least two H-ARQ processes among a plurality of H-ARQ processes are assigned for the VoIP services such that the assigned H-ARQ processes are separated as far as possible.

28. The apparatus of claim 1 wherein the VoIP packet is fragmented into at least two fragments on a condition that the transmit VoIP packet does not fit into currently assigned radio resources, whereby the transmit VoIP packet is sent in fragments.

29. The apparatus of claim 28 wherein the MAC layer sends a request for additional radio resources along with a first fragment and sends remaining fragments using the additional radio resources.

30. The apparatus of claim 29 wherein the additional radio resources are assigned for remaining fragment.

31. The apparatus of claim 29 wherein the additional radio resources are assigned for the entire VoIP packet.

32. The apparatus of claim 29 wherein the MAC layer sends the remaining fragments using radio resources assigned for synchronous hybrid automatic repeat request (H-ARQ) retransmission of the packet.

33. The apparatus of claim 29 wherein the VoIP packet is a retransmission of previous failed packet.

34. The apparatus of claim 33 wherein the MAC layer transmits a retransmission of previous failed packet using the additional radio resources.

35. The apparatus of claim 28 wherein radio resources are assigned periodically.

36. The apparatus of claim 35 wherein minimum radio resources are assigned periodically.

37. The apparatus of claim 28 wherein the MAC layer sends remaining fragments using additional radio resources which are subsequently assigned to the apparatus upon sending a first fragment.

38. A method for supporting voice over Internet protocol (VoIP) services over a wireless communication network, the method comprising:
   encoding data, a coding rate being specified by a controller;
   sending a codec mode request by the controller to adjust the coding rate;
   identifying sensitive bits and non-sensitive bits among the encoded data;
   generating a VoIP packet by attaching an IP header to the encoded data;
   fragmenting the VoIP packet into a plurality of fragments, whereby a fragment including sensitive bits and a fragment including non-sensitive bits are separately processed for error protection, and wherein the VoIP packet is fragmented such that the number of fragments including the sensitive bits is as small as possible;
   processing the VoIP packet for error protection, the error protection being performed on the sensitive bits and the non-sensitive bits separately; and
   transmitting the VoIP packet.

39. The method of claim 38 further comprising:
   sending an explicit indication about the bits sensitive to errors and the bits not sensitive to errors, whereby the sensitive bits and the non-sensitive bits are separately processed for error protection.

40. The method of claim 38 wherein the encoded data is arranged in a predetermined order in accordance with sensitivity to errors, whereby the sensitive bits and the non-sensitive bits are separately processed for error protection.

41. The method of claim 38 wherein the VoIP packet is fragmented by a radio link control (RLC) layer.

42. The method of claim 38 wherein the VoIP packet is fragmented by a medium access control (MAC) layer.

43. The method of claim 38 wherein a medium access control (MAC) layer applies a more robust modulation and coding scheme for a fragment including the sensitive bits.

44. The method of claim 38 further comprising:
   attaching a separate cyclic redundancy check (CRC) to each fragment.

45. The method of claim 44 wherein a medium access control (MAC) layer is configured to transmit multiple transport blocks (TBs) in a same transmission time interval (TTI) and each fragment is transmitted via a separate TB with a separate CRC.

46. The method of claim 44 wherein a medium access control (MAC) layer is configured to transmit one transport block (TB) in a transmission time interval (TTI) and each fragment is transmitted in a different TTI.

47. The method of claim 38 wherein a cyclic redundancy check is attached only to a fragment including the sensitive bits.

48. The method of claim 38 wherein a cyclic redundancy check having higher strength in terms of error protection is attached to a fragment including the sensitive bits.

49. The method of claim 38 wherein a physical layer processes the sensitive bits and the non-sensitive bits separately for error protection.

50. The method of claim 49 wherein a medium access control (MAC) layer sends an indication about the number and position of the sensitive bits to the physical layer.

51. The method of claim 49 wherein the physical layer applies less puncturing on the sensitive bits.

52. The method of claim 49 wherein the physical layer applies more repetition on the sensitive bits.

53. The method of claim 38 further comprising:
   compressing a header of the VoIP packet.

54. The method of claim 53 wherein the compression is performed selectively in accordance with an indication from the controller.

55. The method of claim 54 wherein the controller is located in one of a wireless transmit/receive unit (WTRU), a Node-B, a radio network controller (RNC), an access gateway (aGW), or a core network entity.

56. The method of claim 53 wherein the compression is performed selectively in accordance with feedback regarding radio channel condition from a network entity.

57. The method of claim 56 further comprising:
   attaching a user datagram protocol (UDP)-Lite header including a checksum coverage field for partial coverage of the sensitive bits.

58. The method of claim 57 further comprising:
   the controller sending an indication regarding whether UDP-Lite is active or not, whereby a checksum coverage field of the UDP-Lite header is not compressed when UDP-Lite is active.

59. The method of claim 38 wherein the controller sends an indication indicating a need for adjusting the coding rate and a codec mode request (CMR) is sent to a communication peer in response to the indication.

60. The method of claim 38 wherein the controller resides in a wireless transmit/receive unit (WTRU).

61. The method of claim 38 wherein the controller resides in a Node-B.

62. The method of claim 38 wherein the controller resides in an access gateway (aGW).

63. The method of claim 38 further comprising:
   receiving a VoIP packet;
   processing the received VoIP packet for recovering VoIP data; and generating a comfort noise during a silence period without receiving a comfort noise packet.

64. The method of claim 63 further comprising:
forwarding the received VoIP packet to an upper layer with an indication whether or not the received VoIP packet is received successfully.

65. The method of claim 38 further comprising:
performing a synchronous hybrid automatic repeat request (H-ARQ) mechanism for transmission and retransmission of the VoIP packet.

66. The method of claim 65 wherein at least two H-ARQ processes among a plurality of H-ARQ processes are assigned for the VoIP services such that the assigned H-ARQ processes are separated as far as possible.

67. The method of claim 38 further comprising:
fragmenting the VoIP packet into at least two fragments on a condition that the VoIP packet does not fit into currently assigned radio resources, whereby the VoIP packet is sent in fragments.

68. The method of claim 67 further comprising:
sending a request for additional radio resources along with a first fragment, whereby remaining fragments are sent using the additional radio resources.

69. The method of claim 68 wherein additional radio resources are assigned upon receipt of a first fragment, whereby remaining fragments are sent by using the additional radio resources.

70. The method of claim 68 wherein the additional radio resources are assigned for the remaining fragments.

71. The method of claim 68 wherein the additional radio resources are assigned for the entire VoIP packet.

72. The method of claim 67 wherein radio resources are assigned periodically.

73. The method of claim 72 wherein minimum radio resources are assigned periodically.

74. The method of claim 67 wherein the remaining fragments are sent using radio resources assigned for synchronous hybrid automatic repeat request (H-ARQ) retransmission of the VoIP packet.

75. The method of claim 67 wherein the VoIP packet is a retransmission of previous failed packet.

76. The method of claim 75 wherein a previous failed VoIP packet is retransmitted by using the additional radio resources.

* * * * *